No. 807,496. PATENTED DEC. 19, 1905.
C. M. RANKIN.
STOVEPIPE CONNECTOR.
APPLICATION FILED MAY 29, 1905.

Witnesses:
R. E. Hamilton.
K. M. Imboden.

Inventor,
Charles M. Rankin,
by Higdon & Higdon, attys

UNITED STATES PATENT OFFICE.

CHARLES M. RANKIN, OF McLOUTH, KANSAS.

STOVEPIPE-CONNECTOR.

No. 807,496.

Specification of Letters Patent.

Patented Dec. 19, 1905.

Application filed May 29, 1905. Serial No. 262,853.

*To all whom it may concern:*

Be it known that I, CHARLES M. RANKIN, a citizen of the United States, residing at McLouth, in the county of Jefferson and State of Kansas, have invented a new and useful Stovepipe-Connector, of which the following is a specification.

My invention relates to stovepipe-connectors; and the object of my invention is to produce a connector which is especially adapted for connecting any thin metallic or fiber tubes without the use of screw-threads or telescoping, provided that a perfectly airtight or liquid-tight joint is not required.

The most obvious applicability of this connector is to stovepipes, which owing to the thinness of the material of which they are made are easily beaded at their ends to receive the corresponding beads on this connector.

This connector may also be employed for joining sections of steel smoke-stacks of all diameters, for connecting lengths of tin hot-air pipes in buildings and of interior conduits for electric wires, and, as above stated, for all thin tubing which is of sufficiently large diameter, where the joints do not have to be air and liquid tight.

Figures 1, 3:
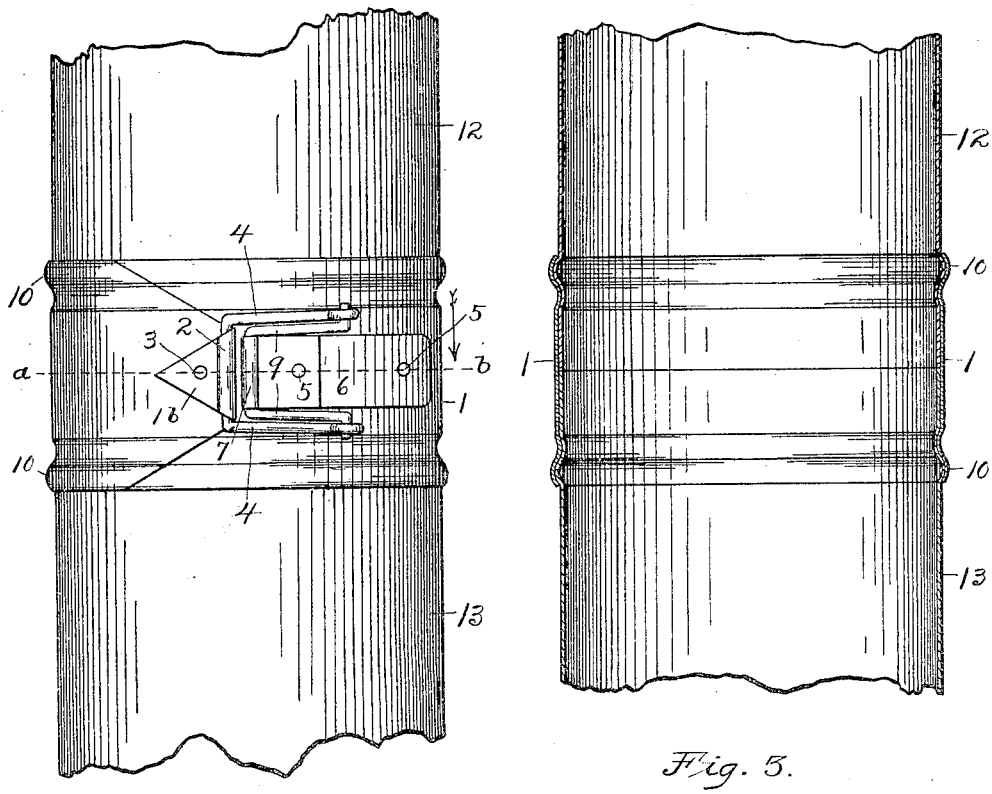
Figure 2:
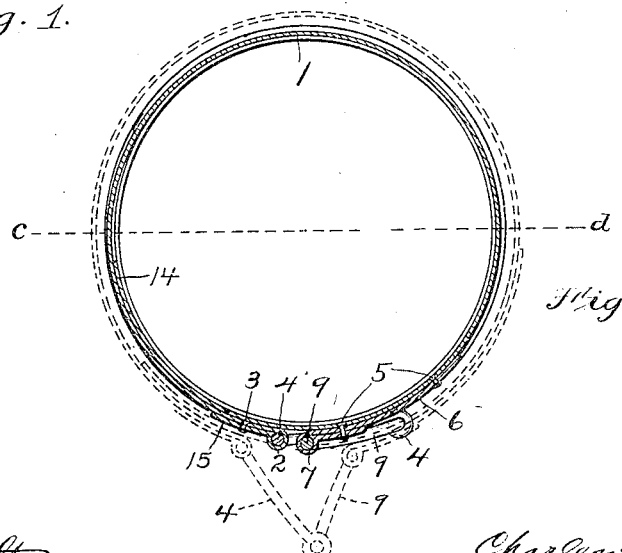

Referring now to the drawings, Figure 1 illustrates one of my connectors locked in position upon two abutting pieces of stovepipe. Fig. 2 is a transverse section taken on line *a b* of Fig. 1, and Fig. 3 is a longitudinal section taken on line *c d* of Fig. 2.

Referring first to Fig. 2, it will be seen that the body of the connector consists of a lap-collar 1, of which 14 designates the inner end and 15 the outer end. The outer end 15 is also shown in Fig. 1. As there shown, it is tapered to a point and is doubled upon itself at 2, being secured by a rivet 3. Through the bend 2 thereof passes a U-shaped tension member 4. Secured to the collar 1 by rivets 5 is a metal strap 6, which is doubled upon itself at 7 and is secured by a rivet 8. Through the bend 7 thereof passes a U-shaped compression member 9. The two ends of this member 9 are pivotally connected to the two ends of the other member 4, thus forming a reverse toggle-joint—that is, whereas a toggle-joint is used for forcing two members apart this device operates to draw the ends of the collar together, in effect. The collar is provided with beads 10 and 10. The purpose of said beads is to engage corresponding beads formed adjacent the ends of the tubes to be connected. The beads on the tubes 12 and 13 are clearly shown in Fig. 3. This figure also shows that the ends of the tubes or pipes are placed in contact, and the beads of the connector effectually prevent the tubes or pipes from being pulled apart after the locking device 4 9 has been operated.

When connecting two tubes or pipes, they are placed end to end, as shown, the collar 1 is slipped thereover, the tension member 4 being turned out at about the angle shown in Fig. 2. At this time the collar is distended, as indicated by dotted lines. All that is necessary to lock the collar tightly upon the pipes is to press the tension member 4 inwardly—*i. e.*, toward the collar—and this movement will swing the compression member 9 inwardly, thereby stretching the collar tight, and the parts finally assume the position shown in Fig. 1. When in this position or having been forced to this position, the tension member 4 is held there, owing to the fact that its arms are so arranged as to lie closer to the collar than the arms of the compression member 9. The contraction and expansion of the collar in attaching and detaching to and from the pipes are provided for by the aforesaid lapping construction thereof, which is clearly shown in Fig. 2.

Within the scope of my appended claims I do not wish to limit myself to the precise details of construction shown in the drawings.

Having described my invention, what I claim as new, and desire to secure by Letters Patent, is—

1. In a connector for stovepipes or other tubes, an expansible and contractible lap-collar, said collar having beads adapted to engage beads on the stovepipes or other tubes, a U-shaped tension member pivotally connected to the outer end of said collar, a U-shaped compression member pivotally connected to the tension member and pivotally connected to the collar; said tension member being adapted to lie closer to the collar than the compression member, for the purpose specified.

2. The combination, with two abutting stovepipes or other tubes, having beads thereon adjacent their ends, of a connector comprising an expansible and contractible lap-collar, said collar having beads adapted to engage the beads aforesaid, a U-shaped tension member pivotally connected to the outer end of the collar, a U-shaped compression member pivotally connected to the tension member and pivotally connected to the collar, said tension member being adapted to lie closer to the collar, when closed, than the compression member, for the purpose specified.

3. A connector for stovepipes or other tubes, the same comprising an expansible and contractible lap-collar, a U-shaped tension member 4, pivotally connected to the outer end of the collar, a U-shaped compression member 9 pivotally connected to said tension member and pivotally connected to the collar; the free ends of the tension member being connected to the free ends of the compression member, and the collar being tightened by pressing the tension member inwardly, thereby moving the compression member inwardly; substantially as described.

In testimony whereof I affix my signature in the presence of two witnesses.

CHARLES M. RANKIN.

Witnesses:
W. R. COULSON,
E. D. BRADFORD.